Figure 1:
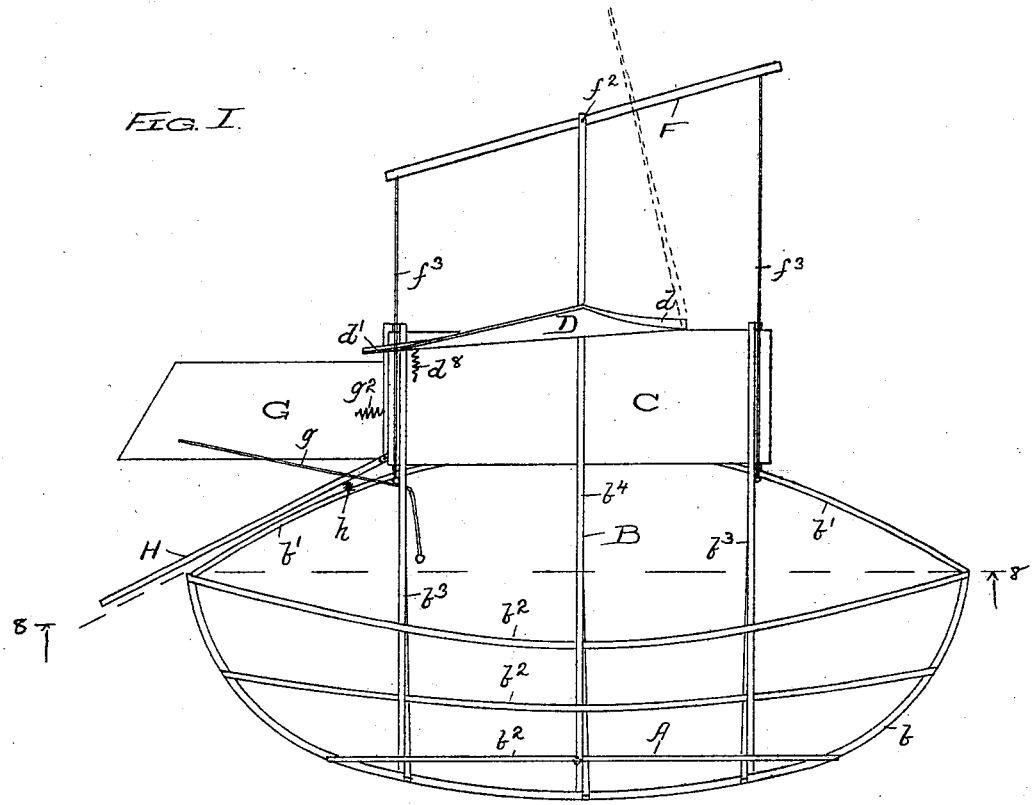

(No Model.) 5 Sheets—Sheet 1.

W. P. BUTUSOV.
SOARING MACHINE.

No. 606,187. Patented June 28, 1898.

WITNESSES:
Geo. C. Curtis
H. W. Munday

INVENTOR:
WILLIAM PAUL BUTUSOV
BY Munday, Evarts & Adcock,
HIS ATTORNEYS.

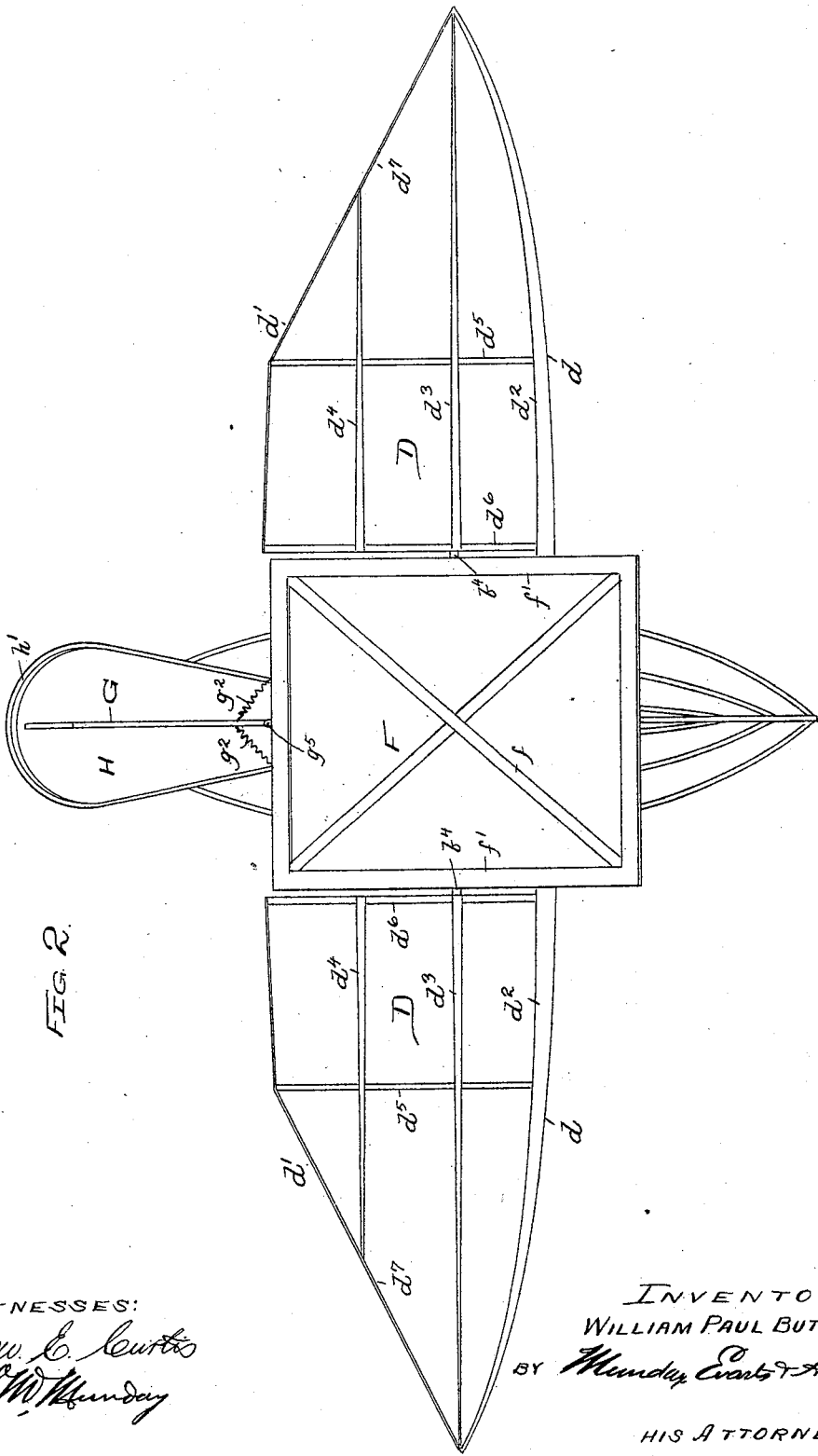

(No Model.)  5 Sheets—Sheet 3.

W. P. BUTUSOV.
SOARING MACHINE.

No. 606,187.  Patented June 28, 1898.

WITNESSES:
Sew. C. Curtis
H. W. Munday

INVENTOR:
WILLIAM PAUL BUTUSOV
BY Munday, Evarts & Adcock
HIS ATTORNEYS (No Model.)　　　　W. P. BUTUSOV.　　5 Sheets—Sheet 4.
SOARING MACHINE.
No. 606,187.　　　　Patented June 28, 1898.
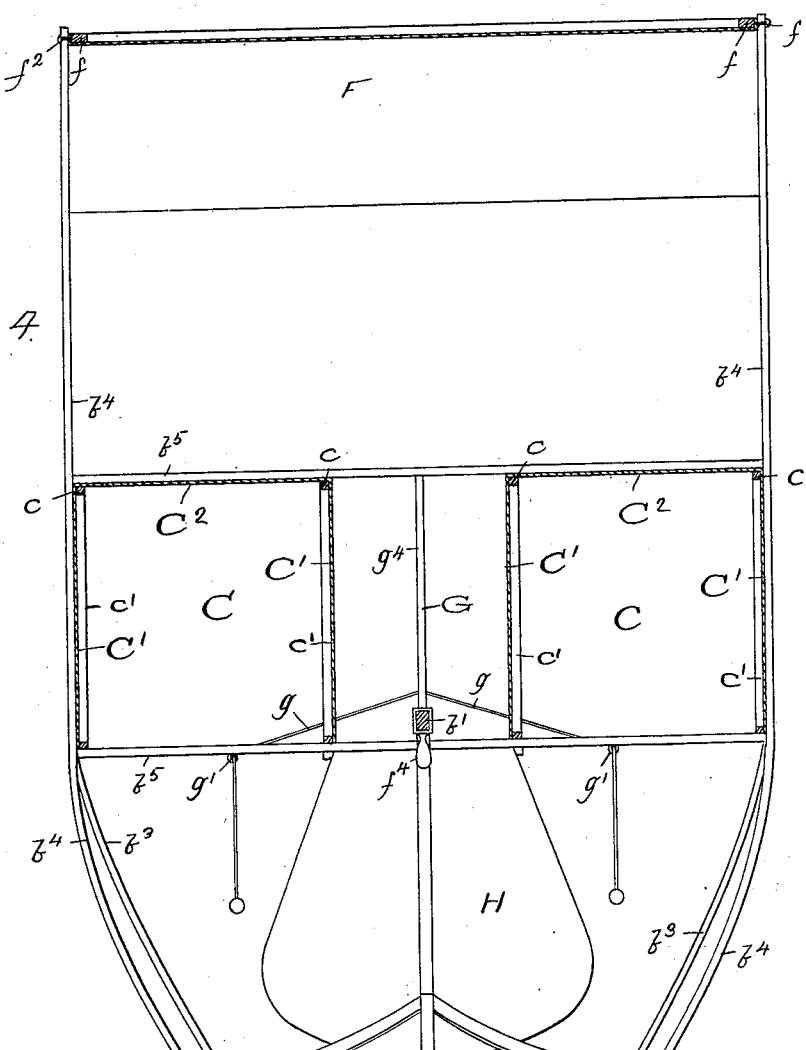
FIG. 4.
FIG. 6.
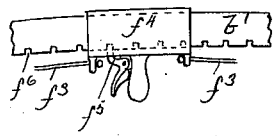
FIG. 7.
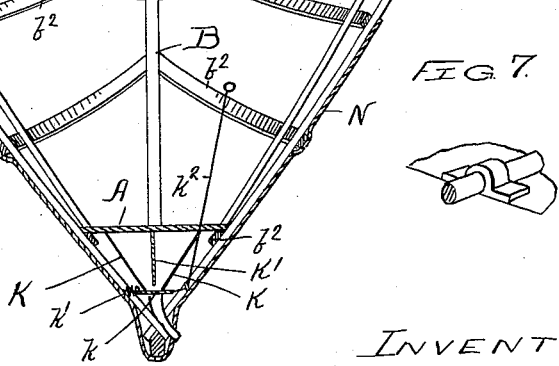
WITNESSES:
INVENTOR:
WILLIAM PAUL BUTUSOV
BY Munday, Evarts & Adcock.
HIS ATTORNEYS.

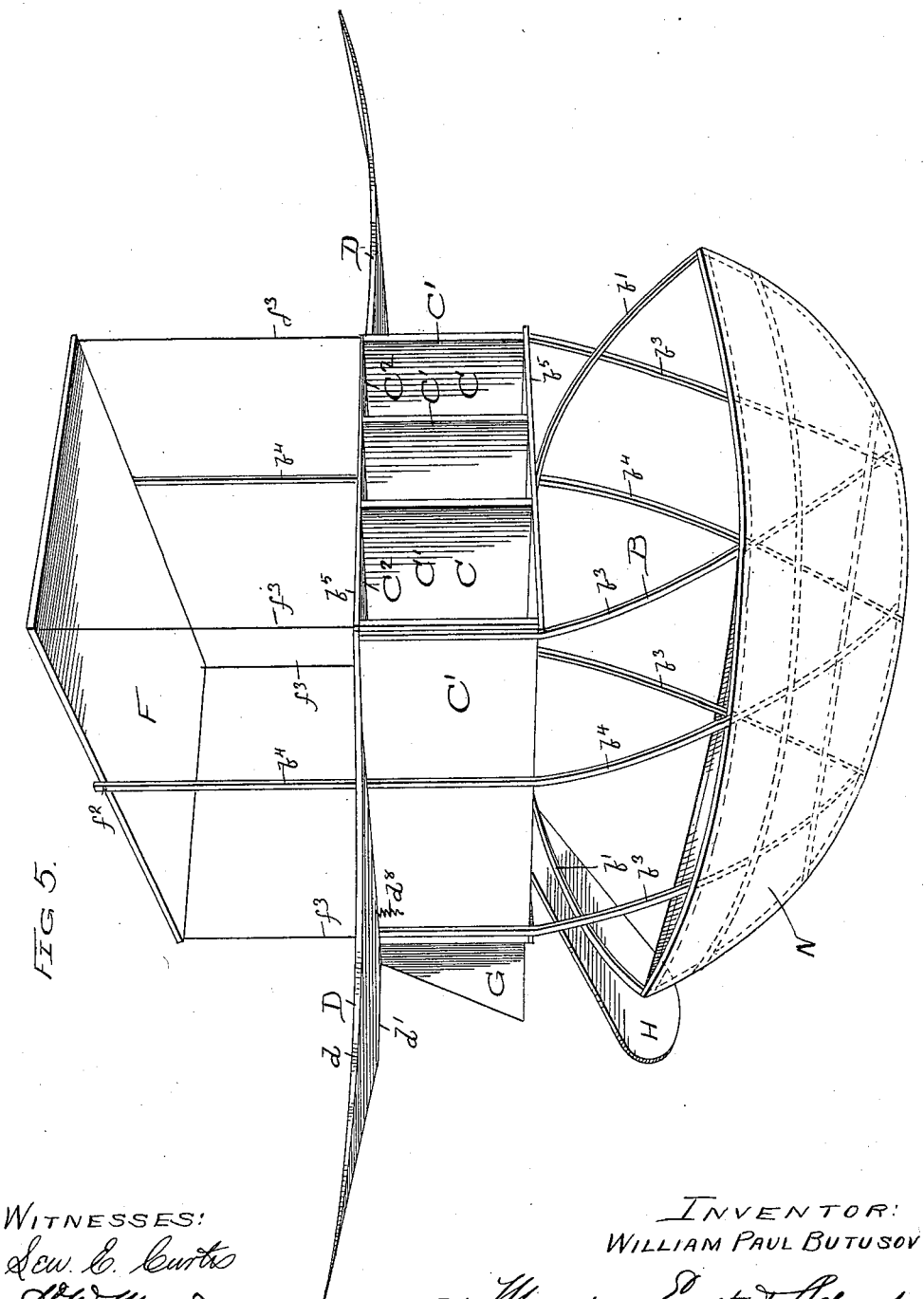

UNITED STATES PATENT OFFICE.

WILLIAM PAUL BUTUSOV, OF CHICAGO, ILLINOIS.

SOARING-MACHINE.

SPECIFICATION forming part of Letters Patent No. 606,187, dated June 28, 1898.

Application filed July 15, 1896. Serial No. 599,309. (No model.)

*To all whom it may concern:*

Be it known that I, WILLIAM PAUL BUTUSOV, a citizen of the United States, residing in Chicago, in the county of Cook and State of Illinois, have invented a new and useful Improvement in Soaring-Machines, of which the following is a specification.

My invention relates to improvements in sailing or soaring machines.

The object of my invention is to provide a machine for sailing or soaring in the air of a simple, strong, light, and durable construction, capable of being perfectly balanced and controlled at all times, and which can be operated with safety and ease, having but few movable parts or devices requiring manipulation.

A machine embodying my invention comprises the following principal parts or elements: first, a support or platform for the rider and ballast, upon which the rider stands and can move freely back and forth as required for balancing the machine and steering it up or down; second, balancing tunnels or keels above the rider's platform; third, wings projecting at each side of the balancing tunnels or keels; fourth, a framework, preferably of a skeleton boat shape, rigidly connecting the rider's platform, the balancing tunnels or keels, and the wings; fifth, a kite or plane above the balancing tunnels or keels and hinged or mounted movably on the frame, so that its inclination may be varied or adjusted vertically as required, according to the strength of the wind or the velocity of the machine or to facilitate its rising or descending movements; sixth, a rudder at the rear of the balancing tunnels or keels and hinged to or mounted movably on the frame, so that it may be swung horizontally as required for turning or steering the machine in different directions; seventh, a tail connected to the frame at the rear of the balancing tunnels or keels and projecting at a downward inclination and held yieldingly against the pressure of the air by a spring, and, eighth, a ballast-box below the platform, filled with sand and provided with a valve, so that it may be emptied at the will of the operator.

My invention consists in the novel construction and novel combinations of these parts or devices and also in the novel combinations of any number of them less than the whole.

In my machine, as the rider's platform or support is located under the wings, balancing-tunnels, and kite or plane, or under the sustaining devices, and connected rigidly thereto by a framework, the machine is automatically balanced and prevented from tilting sidewise by the natural tendency of the rider's weight and of such ballast as may be carried to always assume and maintain the lowest possible position. The tendency of the machine therefore is always to right itself against any lateral or sidewise tilting movement, this function being performed by the rigid framework connecting the platform or support for the rider and ballast and the wings and other sustaining devices. Also, as the platform or support for the rider is located beneath the sustaining devices and rigidly connected to them by the framework longitudinally, or in the direction of the length of the machine, when the rider remains stationary on the platform the machine also tends naturally to maintain its position or balance in respect to tilting longitudinally up or down when normally moving at any particular velocity of machine or wind. My machine is therefore automatically balanced in respect to both lateral and longitudinal tilting movements when under motion, and as the rider stands unconfined on his platform and is free to step or move forward or back to tilt the machine longitudinally upward or downward, as required to cause it to rise or descend or as may be required to preserve the position and balance of the machine under the constantly-varying conditions as to the velocity of the machine in the air and as to the force and direction of the wind, it is easy for the rider to keep the machine at all times under perfect balance and control whatever may be the direction of the motion of the machine in respect to the direction of the wind or in respect to the horizon or whether ascending or descending or whatever may be the velocity of the machine or the velocity of the wind. As in my machine the rider is enabled to keep the machine at all times under perfect balance and control by simple movements of his body on the platform, which he soon learns to do almost by instinct, as a child learns to walk or as a person learns to ride a bicycle or to swim, his hands, as well as his attention or mind, are left substantially free or unengaged, and may therefore be devoted almost entirely to the single purpose of guiding the direction of the machine up or down or in respect to the points of the compass. The guiding or steering of the machine in respect to the points of the compass is effected by simply moving the rudder to one side or the other, and to enable this to be conveniently done strong cords connected to the rudder are brought into easy reach of his hands whatever may be the position he occupies on the balancing or supporting platform.

The steering or guiding of the machine up or down or so as to cause it to ascend or descend, as may be required from time to time, is effected by the operator moving or leaning his body forward or back, so as to change the angle of incidence of the kite or plane to the wind and that of the wings to the wind. The angle of the kite or plane may be changed from time to time, according to the force of the wind.

Figure 8:
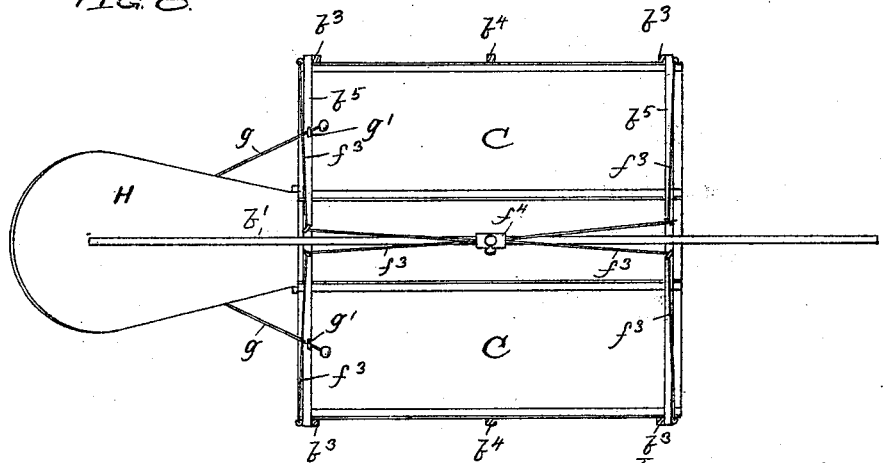
Figure 5:
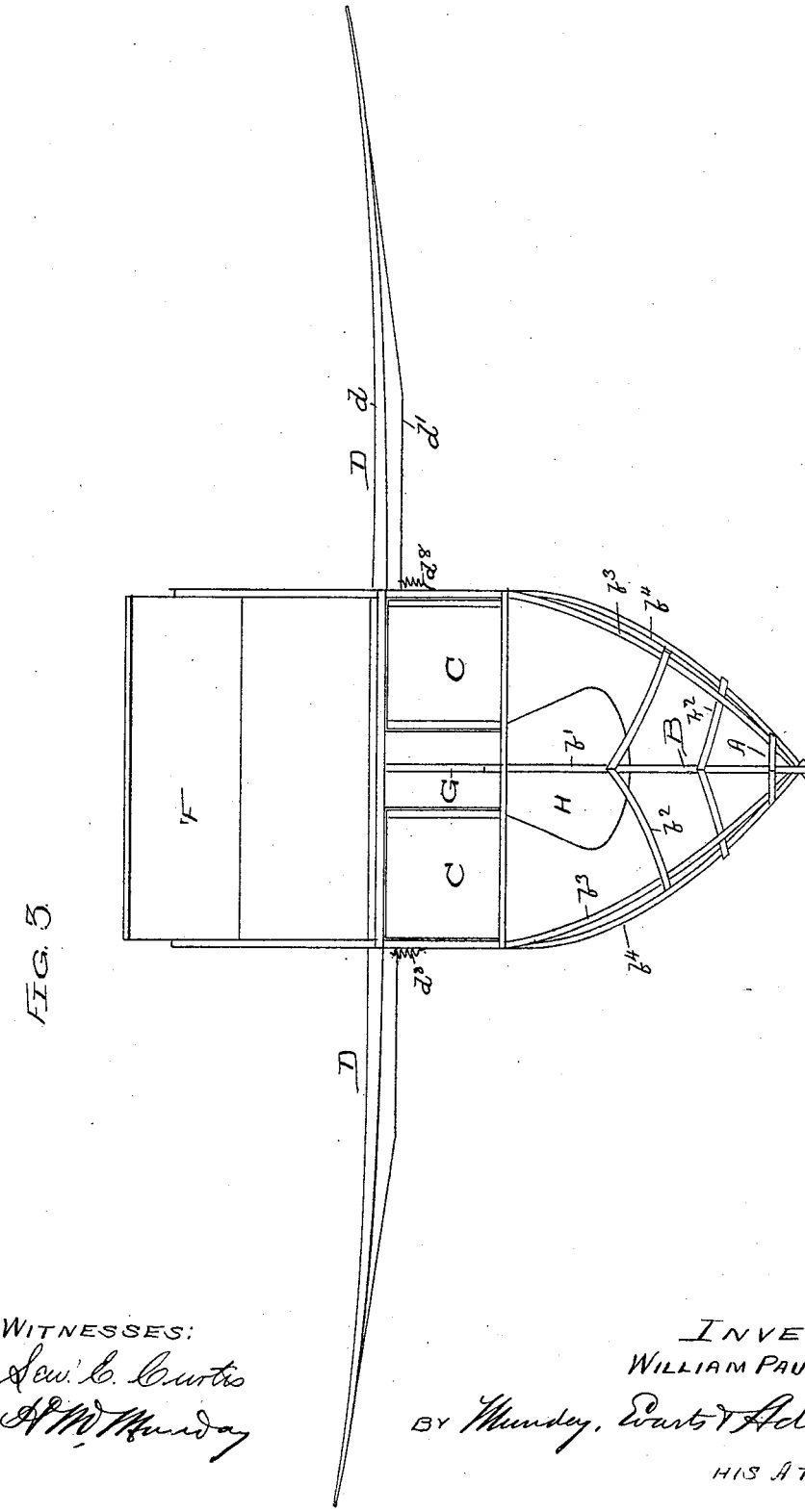

In the accompanying drawings, forming a part of this specification, I have shown at Figure 1 a side elevation of a sailing or soaring machine embodying my invention, at Fig. 2 a plan view, and at Fig. 3 a front view. Fig. 4 is a vertical cross-section. Fig. 5 is a perspective view, and Figs. 6 and 7 are detail views, of parts hereinafter to be described; and Fig. 8 is a section on line 8 8 of Fig. 1.

In the drawings like letters of reference indicate like parts throughout all the figures.

In said drawings, A represents the platform or support upon which the rider or operator stands; B, the framework; C C, the balancing tunnels or keels; D D, the wings; F, the kite or plane; G, the rudder; H, the tail, and K the ballast box or vessel. The frame B, I preferably make of a general boat shape in form and of a skeleton character, as I can thus best secure the requisite qualities of lightness and strength against all sorts of racking or twisting strains either in lateral, longitudinal, or other directions. The skeleton frame thus comprises a lower central longitudinal bowed rib $b$, an upper central bowed rib $b'$, three or more bowed side ribs $b^2 \, b^2 \, b^2$ on each side, three upright bowed ribs $b^3 \, b^3 \, b^4$ on each side, and cross-bars $b^5 \, b^5$, two at each end of the balancing tunnels or keels. The two middle vertical ribs $b^4 \, b^4$, one on each side, are extended up above the balancing-tunnels C C and wings D D to form standards or supports for mounting or hinging the kite or plane F.

The tunnels or keels C C, one on each side, each consist of two upright sides $C' \, C'$ and a top $C^2$, both preferably of oiled silk stretched over and secured to light rectangular frames $c \, c'$, the longitudinal ribs $c \, c$ of the outside rectangular frames serving to connect and brace the vertical ribs $b^3 \, b^3 \, b^4$ on each side of the machine and the longitudinal ribs $c \, c$ of the two inner frames serving to connect and brace the front and rear cross-bars $b^5 \, b^5$; and the upright bars $c' \, c'$ serve also to connect and brace the upper and lower cross-bars $b^5 \, b^5$. The balancing tunnel or keel frames $c \, c'$ thus coöperate with the main frame B and serve to materially strengthen the same, while at the same time supporting and holding in position the oiled silk or other sheets forming the sides of the balancing tunnels or keels.

The wings D are preferably shaped about as shown in the drawings and project horizontally and centrally from each side of the machine at about the level of the tops of the balancing tunnels or keels C C. The wings D, however, are each inclined slightly downward from their front curved edge $d$ toward their inclined back edge $d'$. The wings each consist of a sheet of oiled silk or other suitable material stretched over and secured to a wing-frame comprising, preferably, a front curved longitudinal rib $d^2$, a main longitudinal rib $d^3$ and a short longitudinal rib $d^4$, and two cross-ribs $d^5 \, d^6$, and a cord $d^7$, forming the rear edge of the wing. The front curved ribs $d^2 \, d^2$ of both wings are preferably made of a single piece, the same extending entirely across the top of the balancing tunnels or keels C C. The wings are preferably held yieldingly in position by springs $d^8 \, d^8$, attached to their rear inner corners and to the frame.

The kite or plane F consists, preferably, of a sheet of oiled silk or other suitable material stretched over and secured to a diagonally-braced rectangular frame $f$, the longitudinal side pieces $f'$ of which are pivoted at $f^2$ to the upper ends of the long vertical ribs $b^4 \, b^4$. The kite or plane F is held in position and its inclination adjusted from time to time, as required, by means of steering-cords $f^3 \, f^3$, extending each from the front to the rear end of the kite and brought down into convenient reach of the rider or operator, as illustrated in the drawings. One of these cords is preferably provided at each side of the kite or plane, so that the kite or plane may be held by the cord at each of its four corners. The cords $f^3$ are secured to a sliding clamp $f^4$, having a pawl $f^5$, which engages a notched bar $f^6$, so that by moving the clamp the kite or plane may be adjusted to any angle desired, according to the force of the wind.

The rudder G is swung to one side or the other, as required in turning or steering the machine, by means of cords $g \, g$, one secured to it on each side and led through guide-loops $g' \, g'$ into convenient reach of the operator. The rudder G is automatically returned to and held in its straight or normal position by one or more springs $g^2$, preferably two, one attached at each side of the rudder. The rudder G consists, preferably, of a sheet of oiled silk or other suitable material stretched over and secured to a light trapezoidal-shaped frame, the front upright bar $g^4$ of which serves as a hinge or pivot of the rudder and is mounted in suitable bearings $g^5$ on the rear cross-bars $b^5 b^5$ of the frame centrally between the balancing tunnels or keels C C, so that the currents of air passing through or between the balancing-tunnels may strike the rudder when it is turned at an angle and thus render the rudder more effective.

The tail H is made, preferably, of about the shape illustrated in the drawings. It is hinged at its front end centrally to the frame directly below the rudder and projects, preferably, at a slight downward inclination. It is preferably held yieldingly in position by a spring $h$, attached to the upper longitudinal bar $b'$ of the frame and to the tail, so that the tail may give to a greater or less extent against the pressure of the wind. The tail H consists, preferably, of a sheet of oiled silk or other like material stretched over and secured to a light frame $h'$, formed, preferably, of a single bent strip.

The ballast-containing box or vessel K is preferably secured to the frame directly under the balancing-platform B. It is furnished with a valve or plug $k$, closing an opening in its bottom through which the sand or other pulverized or granular ballast material may be conveniently discharged from the machine in greater or less quantities at the will of the operator, as may be required. The valve or slide $k$ is furnished with a spring $k'$ for retaining it and holding it in its normal or closed position and with a cord $k^2$, leading into convenient reach of the operator, for opening the valve when required. The ballast box or vessel K is also furnished with a partition or division plate $K'$ to prevent the ballast from shifting to one side of the machine.

When the machine is used for sailing or soaring over bodies of water, I prefer to cover the lower or boat portion of the frame with a water-tight covering, as indicated at N in Fig. 5 of the drawings, so that in case of accident or the machine lighting upon the water it may thus serve as a boat to convey the rider to shore, and for the same purpose I mount the wings D on the frame in such manner that they may be turned up, as indicated in dotted lines in Fig. 1, so that they may serve as sails.

In the drawings I have for convenience of illustration shown the frame bars, ribs, or strips and the frame-pieces of the wings, keels, kite, and other parts very much out of proportion in respect to their size or cross-sectional area. In a full-sized machine, in which the kite or plane is eight feet wide by nine feet long and the spread of the wings thirty-eight feet, the balancing tunnels or keels nine feet long and three feet square, and the height between the balancing-platform and the upper longitudinal bowed bar $b'$ of the frame six feet at the middle, so as to give ample room for the rider to stand and move back and forth on the platform, the frame-pieces, if made of solid wood, may all be less than one-half inch in cross-sectional area and still give the machine and its framework ample strength, stiffness, and rigidity against all kinds of strains to which it may be subjected in use. Owing to what may be termed the "double" or "universal" boat shape of the frame, due to the use of the upper and lower longitudinal bowed ribs $b b'$, joined together at their ends, in connection with the other longitudinal bowed ribs and the upright bowed ribs and cross-ribs and other parts of the frame, the structure possesses very great strength, stiffness, and rigidity and has little weight for its strength and is peculiarly adapted for the use intended and to safely withstand the strains to which the machine is subjected in use.

The dimensions of the kite or plane, the balancing tunnels or keels, the wings, rudder, tail, and other parts may be increased or diminished and their shape and construction also varied without departing from the general principle of my invention, and not only the outline but the surfaces of the wings may also be varied as desired—that is to say, the wings may be made either with a flat or plane surface or with a curved surface, as may be preferred.

In operation the machine is started or got under motion in the air from a suitable elevation or by propelling it rapidly against the wind, as a kite, until it reaches a considerable elevation, and then the pulling-rope loosened, when the machine is ready to soar or sail in the air. When in the air, the machine operates simply as a soaring or sailing device, and the rider or operator may cause it to imitate the motions of ordinary soaring birds, such as circling round and round, rising against the wind, and sailing with it or at an angle to it to distant points. To rise from a given height to a greater height, the operator turns the machine with the wind and tilts it downward at a slight angle, keeping it in this position until the machine by its continued descent acquires a great velocity, and then the operator by turning the machine around against the wind and simultaneously tilting it upward as it moves against the wind it rises to a still greater height by the combined force of the wind and the force represented by the velocity acquired by its previous descending movement with the wind. The upward flight is thus continued until the velocity of the machine is greatly reduced, and then the machine is again turned with the wind and caused to again descend with it, this operation thus being repeated again and again until the operator reaches the desired height. To sail to a distant point directly against the wind, the operator first causes the machine by the circling movements before described to rise to a great height and then to descend until it gets under great velocity, when it may be then directed in a substantially horizontal flight to a considerable distance against the wind, as the machine encounters comparatively little resistance when the wings and other parts are moving nearly edgewise through the air.

In turning or moving in circles round and round the rider or operator by inclining his body to one side—the inner side of the circle—causes the machine to tilt to that side, and thus preserves its true balance under the centrifugal action of the circling motion and also facilitates the turning, and at all times the operator can keep the machine under perfect balance and control by simply moving or inclining his body forward or back or to one side or the other, as may be required.

By providing my soaring-machine with a suitable motor and a suitable screw-blade or other propeller driven by the motor it will be converted into a true flying-machine; but I do not herein make any claim to the combination of my soaring-machine with a motor and propeller, as the same will be made the subject of a future application.

I claim—

1. In a soaring-machine, the combination with a support or platform for the rider to stand and move back and forth upon as required for balancing the machine and steering it up or down, of balancing tunnels or keels above the rider's support or platform, wings projecting at each side of the balancing tunnels or keels, a skeleton boat-shaped framework rigidly connecting the rider's support or platform, the balancing tunnels or keels and the wings, a kite or plane above the balancing tunnels or keels and hinged or mounted movably on the frame so that its inclination or angle of incidence may be varied or adjusted as required, a rudder hinged to the frame at the rear of the balancing tunnels or keels, a tail connected to the frame at the rear of the balancing tunnels or keels and projecting at a downward inclination to the rudder, a ballast box or vessel below the rider's platform and furnished with a valve for emptying the same at the will of the operator, substantially as specified.

2. In a soaring-machine, the combination with a support or platform for the rider to stand and move back and forth upon as required for balancing the machine and steering it up or down, of balancing tunnels or keels above the rider's support or platform, wings projecting at each side of the balancing tunnels or keels, a skeleton boat-shaped framework rigidly connecting the rider's support or platform, the balancing tunnels or keels and the wings, a kite or plane above the balancing tunnels or keels and hinged or mounted movably on the frame so that its inclination or angle of incidence may be varied or adjusted as required, and a rudder hinged to the frame at the rear of the balancing tunnels or keels, substantially as specified.

3. In a soaring-machine, the combination with a support or platform for the rider to stand and move back and forth upon as required for balancing the machine and steering it up or down, of balancing tunnels or keels above the rider's support or platform, wings projecting at each side of the balancing tunnels or keels, a skeleton boat-shaped framework rigidly connecting the rider's support or platform, the balancing tunnels or keels and the wings, a kite or plane above the balancing tunnels or keels and hinged or mounted movably on the frame so that the inclination or angle of incidence may be varied or adjusted as required, a rudder hinged to the frame at the rear of the balancing tunnels or keels, and a ballast box or vessel below the rider's platform and furnished with a valve for emptying the same at the will of the operator, substantially as specified.

4. In a soaring-machine, the combination with a support or platform for the rider to stand and move back and forth upon as required for balancing the machine and steering it up or down, of balancing tunnels or keels above the rider's support or platform, wings projecting at each side of the balancing tunnels or keels, a skeleton boat-shaped framework rigidly connecting the rider's support or platform, the balancing tunnels or keels and the wings, a kite or plane above the balancing tunnels or keels and hinged or mounted movably on the frame so that its inclination or angle of incidence may be varied or adjusted as required, a rudder hinged to the frame at the rear of the balancing tunnels or keels, and a tail connected to the frame at the rear of the balancing tunnels or keels and projecting at a downward inclination to the rudder, substantially as specified.

5. In a soaring-machine, the combination with a support or platform for the rider to stand and move back and forth upon as required for balancing the machine and steering it up or down, of balancing tunnels or keels above the rider's support or platform, wings projecting at each side of the balancing tunnels or keels, a skeleton boat-shaped framework rigidly connecting the rider's support or platform, the balancing tunnels or keels and the wings, a kite or plane above the balancing tunnels or keels and hinged or mounted movably on the frame, so that its inclination or angle of incidence may be varied or adjusted as required, a rudder hinged to the frame at the rear of the balancing tunnels or keels, means for operating said rudder and means for adjusting said kite or plane, substantially as specified.

6. The combination with a support or platform for the rider to stand and move back and forth upon as required for balancing the machine in the air and steering it up or down, of balancing tunnels or keels above the rider's platform, wings projecting at each side of the balancing tunnels or keels, a kite or plane, a rudder, and a skeleton boat-shaped framework having upper and lower longitudinal bowed ribs $b, b'$, substantially as specified.

7. The combination with a support or platform for the rider to stand and move back and forth upon as required for balancing the machine in the air and steering it up or down, of balancing tunnels or keels above the rider's platform, wings projecting at each side of the balancing tunnels or keels, a kite or plane, a rudder, a skeleton boat-shaped framework having upper and lower longitudinal bowed ribs $b, b'$, and longitudinal bowed side ribs $b^2$, upright bowed ribs $b^3 b^3 b^4$ on each side, substantially as specified.

8. The combination with a support or platform for the rider to stand and move back and forth upon as required for balancing the machine in the air and steering it up or down, of balancing tunnels or keels above the rider's platform, wings projecting at each side of the balancing tunnels or keels, a kite or plane, a rudder, a skeleton boat-shaped framework having upper and lower longitudinal bowed ribs $b, b'$, longitudinal bowed side ribs $b^2$, upright bowed ribs $b^3 b^3 b^4$ on each side, and front and rear cross-bars $b^5$, substantially as specified.

9. The combination with a support or platform for the rider to stand and move back and forth upon as required for balancing the machine in the air and steering it up or down, of balancing tunnels or keels above the rider's platform, wings projecting at each side of the balancing tunnels or keels, a kite or plane, a rudder, a skeleton boat-shaped framework having upper and lower longitudinal bowed ribs $b, b'$, longitudinal bowed side ribs $b^2$, upright bowed ribs $b^3 b^3 b^4$ on each side, front and rear cross-bars $b^5$, said upright ribs $b^4 b^4$ extending above the balancing tunnels or keels, and said kite or plane being pivoted thereto, substantially as specified.

10. In a soaring-machine, the combination with a support or platform for the rider to stand and move back and forth upon as required for balancing the machine and steering it up or down, of balancing tunnels or keels above the rider's support or platform, wings projecting each side of the balancing tunnels or keels, a skeleton boat-shaped framework rigidly connecting the rider's support or platform, the balancing tunnels or keels and the wings, a kite or plane above the balancing tunnels or keels and hinged or mounted movably on the frame so that its inclination or angle of incidence may be varied or adjusted as required, a rudder hinged to the frame at the rear of the balancing tunnels or keels, a tail connected to the frame at the rear of the balancing tunnels or keels and projecting at a downward inclination to the rudder, and a spring for holding the tail yieldingly in position, substantially as specified.

11. In a soaring-machine, the combination with a support or platform for the rider to stand and move back and forth upon as required for balancing the machine and steering it up or down, of balancing tunnels or keels above the rider's support or platform, wings projecting at each side of the balancing tunnels or keels, a skeleton boat-shaped framework rigidly connecting the rider's support or platform, the balancing tunnels or keels and the wings, a kite or plane above the balancing tunnels or keels and hinged or mounted movably on the frame so that its inclination or angle of incidence may be varied or adjusted as required, a rudder hinged to the frame at the rear of the balancing tunnels or keels, and springs for automatically holding the rudder in its normal position, substantially as specified.

12. In a soaring-machine, the combination with a support or platform for the rider to stand and move back and forth upon as required for balancing the machine and steering it up or down, of balancing tunnels or keels above the rider's support or platform, wings projecting at each side of the balancing tunnels or keels, a skeleton boat-shaped framework rigidly connecting the rider's support or platform, the balancing tunnels or keels and the wings, a kite or plane above the balancing tunnels or keels and hinged or mounted movably on the frame so that its inclination or angle of incidence may be varied or adjusted as required, a rudder hinged to the frame at the rear of the balancing tunnels or keels, and springs for holding the wings yieldingly in position or at the required angle of incidence to the wind, substantially as specified.

13. A soaring-machine having a balancing platform or support below the sustaining devices for the rider to stand upon and balance the machine and steer it up or down by moving back and forth on said platform or support as required, and sustaining devices comprising wings projecting to each side and a kite or plane above the wings, substantially as specified.

14. A soaring-machine having a support for the rider to stand upon, adapted to permit him to balance and control the machine by movements of his body backward and forward, and sustaining devices above said rider's support comprising wings projecting to each side, a tail projecting to the rear and a kite or plane above the wings and centrally above said rider's support, substantially as specified.

15. A soaring-machine having a support or platform for the rider to stand upon and balance the machine and steer it up or down by movements of his body on said platform or support, and a rigid framework connecting such support or platform with the sustaining devices above it, and sustaining devices comprising wings projecting to each side and a kite or plane above the wings, substantially as specified.

16. The combination with a support or platform for the rider to stand and move back and forth upon as required for balancing the machine and steering it up or down, of balancing tunnels or keels above the rider's support or platform, wings, a framework connecting the rider's support or platform and said keels and wings, a kite or plane and a rudder, substantially as specified.

17. The combination with a support or platform for the rider to stand and move back and forth upon as required for balancing the machine and steering it up or down, of balancing tunnels or keels above the rider's support or platform, wings, a framework connecting the rider's support or platform and said keels and wings, a kite or plane, a rudder, and a tail, substantially as specified.

18. The combination with a support or platform for the rider, of balancing tunnels or keels above the rider's support or platform, wings, and a rigid frame connecting the rider's support or platform with the keels and wings, substantially as specified.

19. The combination with a support or platform for the rider, of balancing tunnels or keels above the rider's support or platform, and wings, substantially as specified.

20. The combination with a balancing support or platform for the rider, of balancing tunnels or keels, a frame connecting the same, and a kite or plane, substantially as specified.

21. The combination with a balancing support or platform for the rider, of balancing tunnels or keels, a frame connecting the same, a kite or plane and a rudder, substantially as specified.

22. In a soaring-machine a double boat-shaped skeleton frame, provided with lower and upper longitudinal bowed ribs $b\ b'$, in combination with sustaining devices comprising wings projecting to each side and a kite or plane above the wings, substantially as specified.

23. In a soaring-machine a double boat-shaped skeleton frame provided with lower and upper longitudinal bowed ribs $b\ b'$, the longitudinal bowed side ribs, upright bowed ribs on each side, and cross-bars connecting the upright bowed ribs, in combination with sustaining devices comprising wings projecting to each side and a kite or plane above the wings, substantially as specified.

24. In a soaring-machine a double boat-shaped skeleton frame provided with lower and upper longitudinal bowed ribs $b\ b'$, the longitudinal bowed side ribs, upright bowed ribs on each side and cross-bars connecting the upright bowed ribs, the middle upright bowed ribs being extended to form supports for a kite or plane, in combination with sustaining devices comprising wings projecting to each side and a kite or plane above the wings, substantially as specified.

25. In a soaring-machine, the combination with a frame of balancing tunnels or keels having horizontal and vertical surfaces, wings projecting laterally from the balancing tunnels or keels, and a rudder, substantially as specified.

26. In a soaring-machine, the combination with a frame of balancing tunnels or keels having horizontal and vertical surfaces, wings projecting laterally from the balancing tunnels or keels, a rudder, and a kite or plane above the balancing tunnels or keels, substantially as specified.

27. In a soaring-machine, the combination with a frame of balancing tunnels or keels having horizontal and vertical surfaces, wings projecting laterally from the balancing tunnels or keels, a rudder, a kite or plane above the balancing tunnels or keels, and a tail, substantially as specified.

28. In a soaring-machine, the combination with a frame of balancing tunnels or keels having horizontal and vertical surfaces, wings projecting laterally from the balancing tunnels or keels, a rudder, a kite or plane above the balancing tunnels or keels, and a rider's support or platform below the balancing tunnels or keels, substantially as specified.

29. In a soaring-machine, the combination with a frame of balancing tunnels or keels having horizontal and vertical surfaces, wings projecting laterally from the balancing tunnels or keels, a rudder, a kite or plane above the balancing tunnels or keels, a rider's support or platform below the balancing tunnels or keels, means for turning the rudder, and springs for holding the rudder in its straight or normal position, substantially as specified.

30. In a soaring-machine, the combination with the wings of a hinged kite or plane above the wings and a tail projecting rearwardly below the kite or plane and centrally from the back edge of the wings, substantially as specified.

31. In a soaring-machine, the combination with the wings of a hinged kite or plane above the wings, a frame, and a balancing-support for the rider below the wings and a tail projecting rearwardly below the kite or plane and centrally from the back edge of the wings, substantially as specified.

32. In a soaring-machine, the combination with a frame, a support for the rider below, balancing tunnels or keels, and wings having a longitudinal front rib extending in one piece across the balancing tunnels or keels, substantially as specified.

33. In a soaring-machine, the combination with a frame, a support for the rider below, balancing tunnels or keels, and wings having a longitudinal front rib extending in one piece across the balancing tunnels or keels, said wings being adapted to turn or rotate on said front rib as a pivot, substantially as specified.

34. In a soaring-machine, the combination with a frame, a support for the rider below, balancing tunnels or keels, and wings having a longitudinal front rib extending in one piece across the balancing tunnels or keels, said wings being adapted to turn or rotate on said front rib as a pivot, and springs attached to said wings and to the frame for holding the wings yieldingly in position as to their rear edges, substantially as specified.

35. In a soaring-machine, the combination with a frame, of wings having a longitudinal curved front rib extending across the frame in one piece, and means for pivotally connecting said front rib to the frame, substantially as specified.

36. In a soaring-machine, the combination with a frame having two upright standards or supports, of a kite or plane hinged near its longitudinal middle to said upright standards or supports and held adjustably in position by cords or lines at its four corners and wings projecting to each side below said kite or plane, substantially is specified.

WILLIAM PAUL BUTUSOV.

Witnesses:
H. M. MUNDAY,
EDW. S. EVARTS.